United States Patent
Munsche (10) Patent No.: US 6,482,141 B1
(45) Date of Patent: Nov. 19, 2002

(54) FLEXIBLE END SUPPORTING ARRANGEMENT FOR DIRECT DRIVE ADJUSTABLE SPREADER ROLLS

(75) Inventor: Denis L. Munsche, Neenah, WI (US)

(73) Assignee: Spencer Johnston Company, Neenah, WI (US)

( * ) Notice: Subject to any disclaimer, the term of this patent is extended or adjusted under 35 U.S.C. 154(b) by 0 days.

(21) Appl. No.: 09/912,820

(22) Filed: Jul. 25, 2001

(51) Int. Cl.$^7$ .................................................. B25F 5/02
(52) U.S. Cl. .......................... 492/47; 492/40; 100/162 B
(58) Field of Search .............................. 492/16, 15, 39, 492/20, 38, 17, 18, 7, 47, 40; 29/898.07, 898, 898.04, 898.061, 898.062, 898.063, 895.22; 384/495, 478, 498; 72/238, 239; 100/162 B (56) References Cited

U.S. PATENT DOCUMENTS

| | | |
|---|---|---|
| 679,821 A | 8/1901 | Arnold |
| 1,040,993 A * | 10/1912 | Bakke .......................... 492/38 |
| 1,266,061 A * | 5/1918 | Scoville ....................... 285/264 |
| 1,515,266 A * | 11/1924 | Mitchell ...................... 384/495 |
| 1,516,083 A | 11/1924 | Curtis |
| 1,734,244 A * | 11/1929 | Bingman .................... 403/143 |
| 1,776,382 A * | 9/1930 | Farrell ......................... 26/101 |
| 1,927,849 A | 9/1933 | Rpberts |
| 2,393,191 A * | 1/1946 | Robertson ............... 100/162 B |
| 2,689,392 A * | 9/1954 | Robertson .................... 26/104 |
| 2,712,205 A | 7/1955 | Valette |
| 2,948,384 A | 8/1960 | Pate |
| 2,952,889 A * | 9/1960 | Hanssen ................. 100/162 B |
| 2,952,898 A * | 9/1960 | Glavan et al. ......... 29/898.062 |
| 3,094,771 A * | 6/1963 | Robertson ............... 100/162 B |
| 3,263,517 A | 8/1966 | Cosmos |
| 3,308,519 A | 3/1967 | Westgate |
| 3,386,149 A | 6/1968 | Robertson |
| 3,463,377 A | 8/1969 | Lucas |
| 3,478,555 A | 11/1969 | Achler et al. |
| 3,645,433 A | 2/1972 | Lucas et al. |
| 3,760,477 A | 9/1973 | Koch |
| 3,763,992 A | 10/1973 | Klenk |
| 3,765,616 A | 10/1973 | Hutzenlaub et al. |
| 3,786,975 A | 1/1974 | Heymanns |
| 3,796,423 A | 3/1974 | Shuster |
| 3,808,846 A | 5/1974 | Fleissner |
| 3,848,304 A | 11/1974 | Lucas |
| 3,878,883 A | 4/1975 | Hazelett et al. |
| 3,889,334 A | 6/1975 | Justus et al. |
| 3,918,774 A | 11/1975 | Nicholson |
| 3,964,658 A | 6/1976 | Edwards |
| 3,969,801 A * | 7/1976 | Dolenc et al. .................. 492/7 |
| 3,980,289 A | 9/1976 | Harm |
| 4,006,704 A | 2/1977 | Perondi |

(List continued on next page.)

FOREIGN PATENT DOCUMENTS

JP 3-210997 9/1991

Primary Examiner—S. Thomas Hughes
Assistant Examiner—Marc Jimenez
(74) Attorney, Agent, or Firm—Ryan Kromholz & Manion, S.C.

(57) ABSTRACT

An arrangement in connection with a spreader roll drive where the driving motor is directly connected to the one end of the spreader roll. Bearings support the end of the stationary axle within the drive shaft. The drive shaft is supported by bearings within a spherical ball clamp, which is held by a spherical cavity in a bracket. The drive shaft is connected to a motor or a motor and gearbox arrangement by a flexible coupling.

5 Claims, 6 Drawing Sheets

U.S. PATENT DOCUMENTS

| | | |
|---|---|---|
| 4,029,264 A | 6/1977 | Reese |
| 4,033,497 A | 7/1977 | Przygocki |
| 4,146,946 A | 4/1979 | Plaia et al. |
| 4,194,275 A | 3/1980 | Freuler |
| 4,201,466 A | 5/1980 | Seelenbinder |
| 4,293,988 A * | 10/1981 | Biondetti ................... 492/7 |
| 4,352,838 A | 10/1982 | Bostroem |
| 4,410,122 A | 10/1983 | Frye et al. |
| 4,422,403 A | 12/1983 | Bostroem |
| 4,455,727 A | 6/1984 | Tschirner |
| 4,552,201 A | 11/1985 | Wood |
| 4,566,154 A | 1/1986 | Streeper et al. |
| 4,669,646 A | 6/1987 | Oinonen |
| 4,691,908 A | 9/1987 | Bradley |
| 4,751,776 A * | 6/1988 | Reunamaki ................ 492/47 |
| 4,793,250 A | 12/1988 | Niskanen |
| 4,795,510 A | 1/1989 | Wittrock et al. |
| 4,803,877 A * | 2/1989 | Yano .................. 100/162 B |
| 4,909,905 A | 3/1990 | Ilmarinen et al. |
| 4,913,051 A | 4/1990 | Molinatoo |
| 4,921,037 A | 5/1990 | Bergeron et al. |
| 4,962,577 A | 10/1990 | Kubik et al. |
| 5,084,139 A | 1/1992 | Autio |
| 5,174,002 A | 12/1992 | Kusters |
| 5,273,197 A | 12/1993 | Wenk |
| 5,421,259 A | 6/1995 | Shiba et al. |
| 5,461,760 A | 10/1995 | Damour |
| 5,477,912 A | 12/1995 | Cisko et al. |
| 5,483,811 A | 1/1996 | Miller |
| 5,484,370 A | 1/1996 | Jenke et al. |
| 5,495,798 A * | 3/1996 | Niskanen et al. ....... 100/162 B |
| 5,702,524 A * | 12/1997 | Finnicum et al. ........... 118/200 |
| 5,735,783 A | 4/1998 | Joensuu |
| 5,746,128 A * | 5/1998 | Reichwein ................ 492/47 |
| 5,832,626 A | 11/1998 | Buttschardt |
| 5,904,812 A | 5/1999 | Salman et al. |
| 6,042,525 A | 3/2000 | Rajaniemi |
| 6,077,390 A | 6/2000 | Salman et al. |
| 6,082,660 A | 7/2000 | Meyer |
| 6,092,761 A | 7/2000 | Mushaben |
| 6,129,305 A | 10/2000 | Moller et al. |
| 6,152,604 A * | 11/2000 | Ostling et al. .............. 384/478 |

\* cited by examiner

FLEXIBLE END SUPPORTING ARRANGEMENT FOR DIRECT DRIVE ADJUSTABLE SPREADER ROLLS

BACKGROUND OF THE INVENTION

The present invention relates to spreader rolls, and in particular to a new and improved device of this type that overcomes the difficulties experienced using the known devices.

Spreader rolls are used on machines for the manufacture of web material, and to spread web material, such as paper, during processing of the material. Typical spreader rolls include a bowed or adjustably bowable, non-rotatable shaft and an outer roll surface mounted for rotation on the shaft. A typical spreader roll is characterized by an arrangement of closely spaced and longitudinally arranged cylinder elements or segments rotatably supported on the stationary, bowed cylindrical shaft. The cylinder elements are held together, end-to-end, by a coupling and cleat combination to thereby present a substantially continuous cylindrical roll surface. A driving motor rotates the interconnected roll segments about the shaft, and in so doing causes the interconnected roll to conform to the arch of the shaft. In known arrangements, the fixed shaft is supported by spherical bearings forming the support. The spherical bearing surface allows for rotation of the fixed shaft, causing a change in the angle between the support and the shaft. The driving motor is connected to the support structure at the driving end. Prior art devices are known to be costly to manufacture and difficult to maintain. Other known arrangements have connected the driving motor directly to the end of the spreader roll by means of a separate clutch and an extension shaft of the motor shaft.

It is an object of the present invention to provide an improved arrangement of directly coupling the driving motor to the end of a spreader roll and yet accommodate the variation in angles between components during use and functional adjustments for individual uses. The present arrangement accomplishes direct coupling of the motor to the spreader roll by use of a combination of splined connections, an adjustable spherical ball clamp supporting the ends of the fixed shaft, and a flexible coupling for connecting an end spreader roll member directly to a drive motor.

More exactly, the arrangement in connection with the spreader roll drive is characterized by what is set forth in the characterizing parts of the attached claims.

SUMMARY OF THE INVENTION

The invention relates to an arrangement in connection with a spreader roll drive. A spreader roll, such as that used in conjunction with the present invention embodies an arrangement of closely spaced cylinder elements or segments, axially aligned, circumjacent to a stationary, adjustable bowed shaft.

The longitudinally arranged cylinder elements are held together end-to-end by press fit couplings and interconnecting cleats, thereby presenting a substantially continuous cylindrical roll surface which is rotated about the stationary, adjustable shaft. The longitudinally arranged cylinder elements are interconnected to each other in a row parallel to the shaft and are mounted on the bowed shaft through their respective bores using rolling bearings so that the outer bearing race rotates with respective cylinder elements, while the inner race is in stationary contact with the shaft. The segments or spools may be rotatably arranged around the shaft as taught in the co-pending U.S. patent application, Ser. No. 09/740,262 filed on Dec. 18, 2000 by the same assignee of the present invention. The opposite ends of the row of interconnected cylinder elements are adapted to be received in a drive shaft by way of a splined connection. The splined connection allows the drive shaft and rotating spools to freely slide as required by the action of the stationary adjustable bowed shaft. The drive shaft is driven to rotate the connected row around the shaft. The arrangement further comprises supporting pedestals or brackets arranged for adjustable support of the ends of the spreader roll and its components. A motor is coupled to the drive shaft for direct drive, via a flexible coupling member, for driving the spreader roll.

Conventional roller or ball bearings support the end of the stationary adjustable bowed shaft within a novel drive shaft. The drive shaft in turn is supported by rotatable bearings within a stationary spherical ball clamp. The spherical ball clamp is held by a spherical cavity formed in the bracket or pedestal. This arrangement allows for any angular misalignment caused by changing of the arched bow of the stationary adjustable axle. The drive shaft is connected to a drive element, such as a motor, or motor and gearbox arrangement, by means of a flexible coupling.

It is an object of the present invention to provide a spreader roll with a novel arrangement of supporting and connecting the drive. The driving element is connected directly to the end of the spreader roll, while accommodating angular misalignment caused by changing of the bow of the stationary adjustable axle during initial installation or operation of the cooperating elements of the spreader roll.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

It is to be noted that like elements shown in the various figures are identified by like reference numerals.

Figure 1:
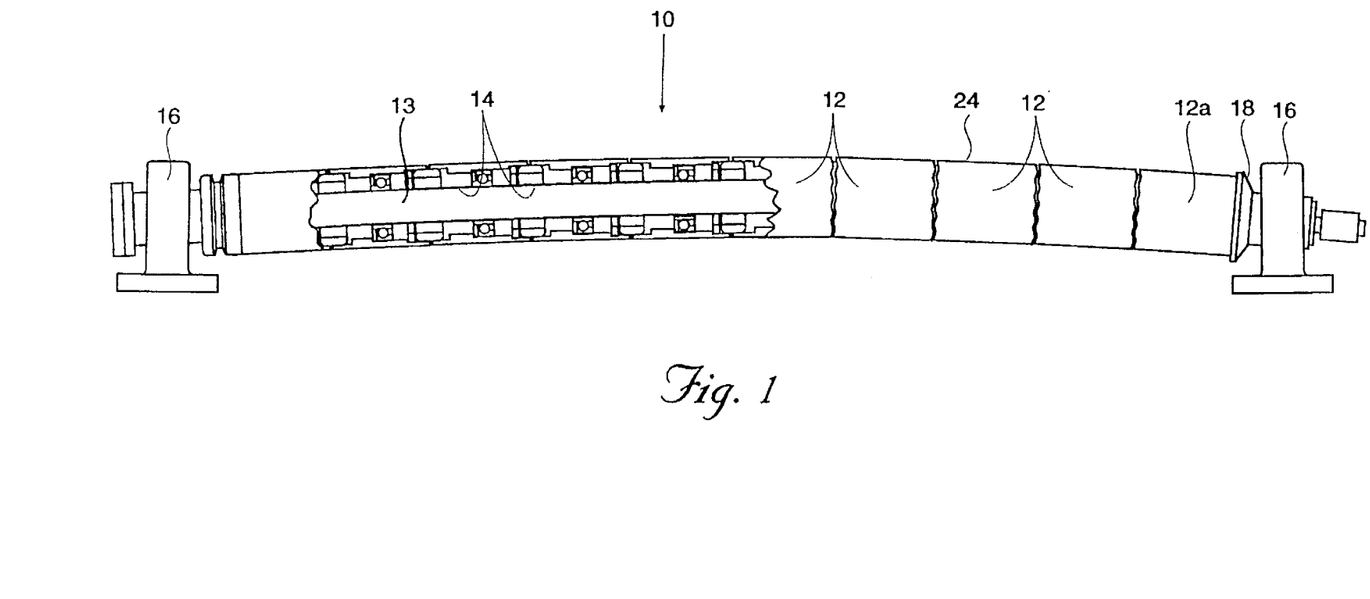
FIG. 1 is a side elevational view, partly in section, of a spreader roll installation in accordance with this invention.
Figure 2:
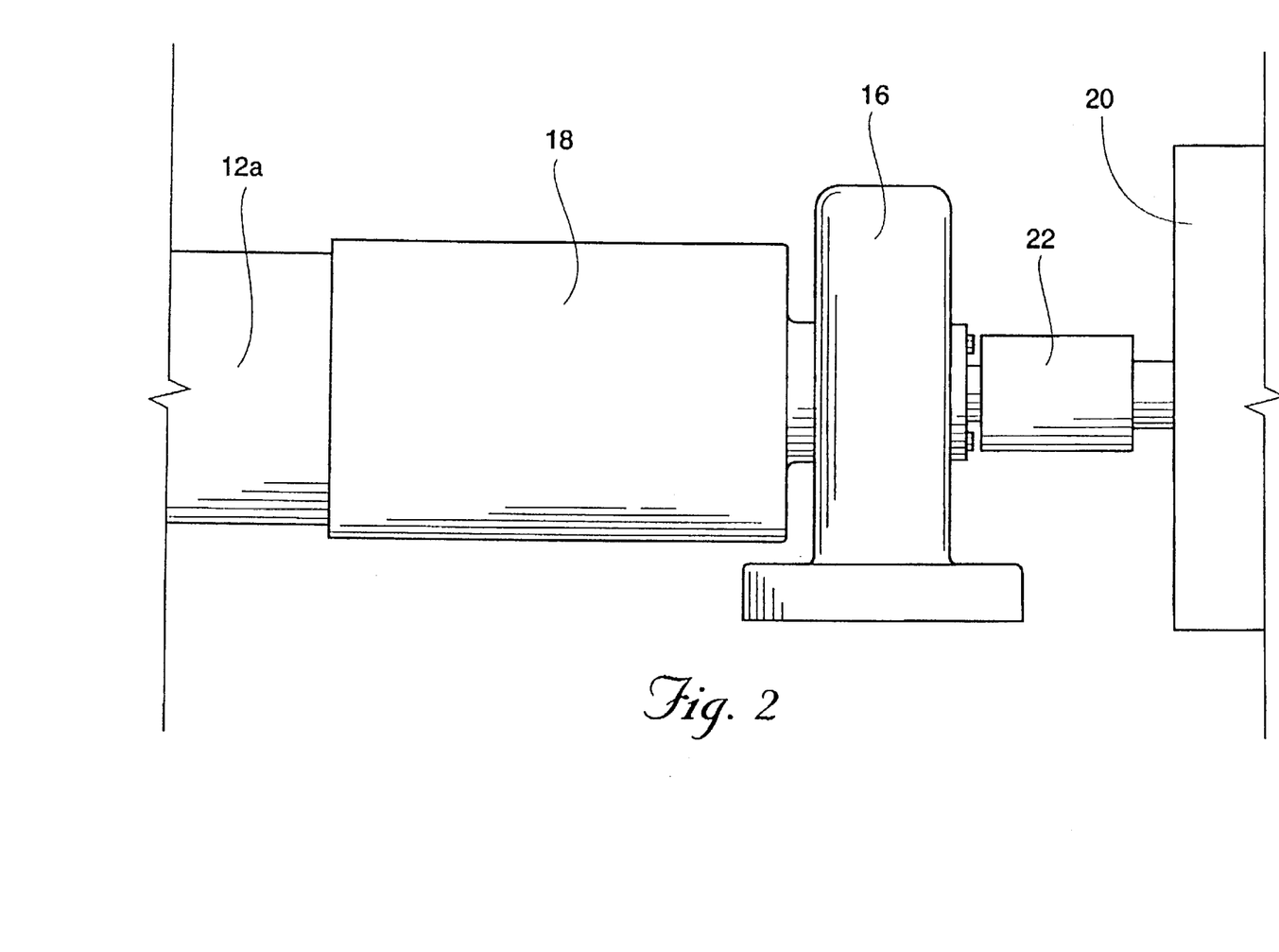
FIG. 2 is an enlarged, fragmentary, elevational view of the drive connection arrangement of the spreader roll shown in FIG. 1.

As seen in the views of FIGS. 1 and 2, the spreader roll 10 of the present invention includes a predetermined number of rotating cylindrical elements or spools 12, each rotatingly supported on a fixed axle or shaft 13 through their respective bores 14. The non-rotating shaft 13 is usually arched or bowed, and in the present case is carried on supporting pedestals or brackets 16. The spreader roll segments 12 are cylindrical and are mutually inter-connected with at least one end segment 12a being connected to a hollow cylindrical drive shaft 18 which is connected to a drive motor 20 via a flexible coupling 22 (see particularly FIG. 2). Thus, the various segments 12 will present a cylindrical outer surface 24 for support of a web-like material (not shown). It is to be understood that the cylindrical outer surface 24 may be rubber-covered (not shown) to provide frictional support of web material.

As stated previously, the cylindrical elements 12 are axially aligned along the shaft 13 with the shaft 13 passing through the respective bore 14 of each cylinder element 12. The longitudinally arranged cylinder elements 12 are held together end-to-end by press fit couplings and interconnecting cleats (not shown) or other known arrangement, to present the outer surface 24. Cylinder end segment 12a is arranged for support and rotation by the cup-like drive shaft 18. The segments or spools 12, 12a, may be rotatably arranged around the shaft 13 as taught in the copending U.S. patent application, Ser. No. 09/740,262 filed on Dec. 18, 2000 by the same assignee as the present invention.

Figure 3:
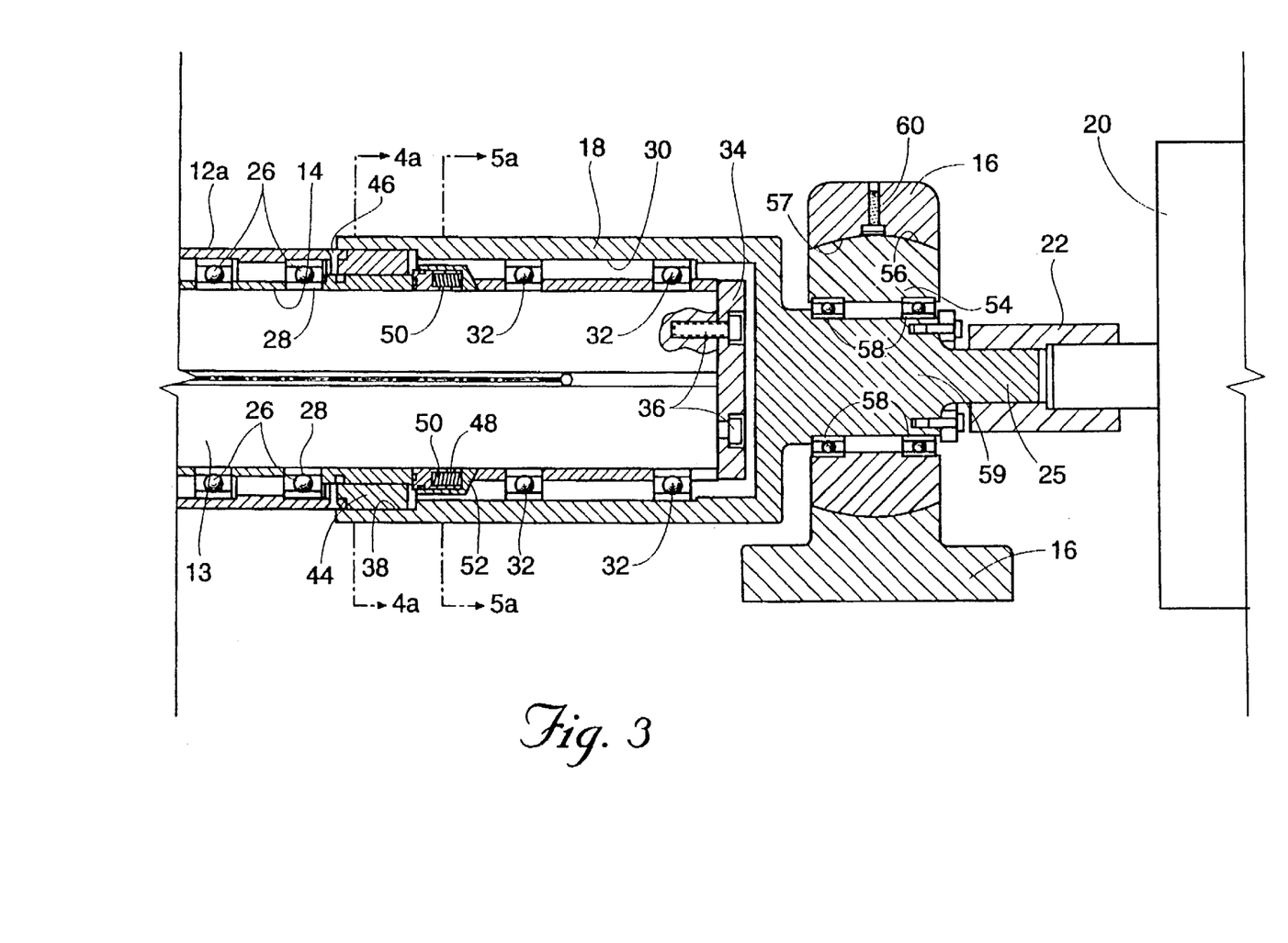
FIG. 3 is an enlarged, fragmentary, longitudinal sectional view illustrating the preferred components of the drive connection shown in the view of FIG. 2.

With particular reference to FIG. 3, the end spool segment 12a is preferably supported by axially spaced ball bearings 26 with inner races 28 resting upon the fixed shaft 13. The inner bore 30 of the drive shaft 18 is supported by axially spaced roller bearings 32. An end cap 34 is preferably supplied to close the end of the non-rotative shaft 13, and is held in place by threaded bolts 36.

Figure 4:
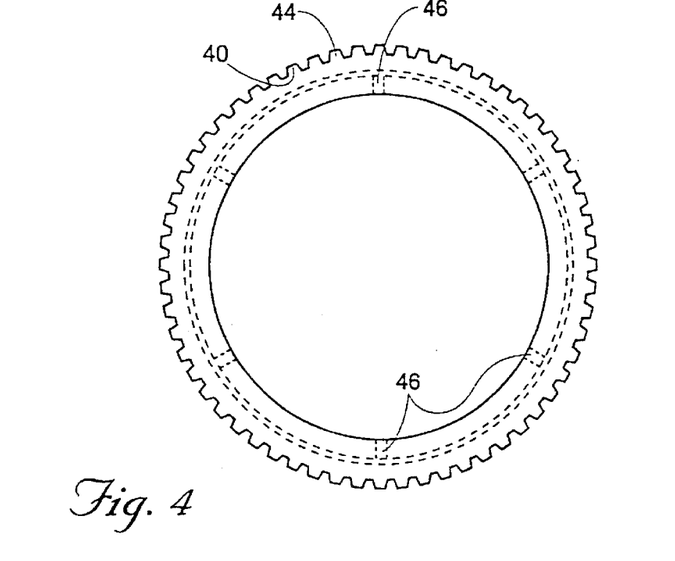
FIG. 4 is an end view of the splined connection and showing the circumferentially spaced grooves.
Figure 4A:
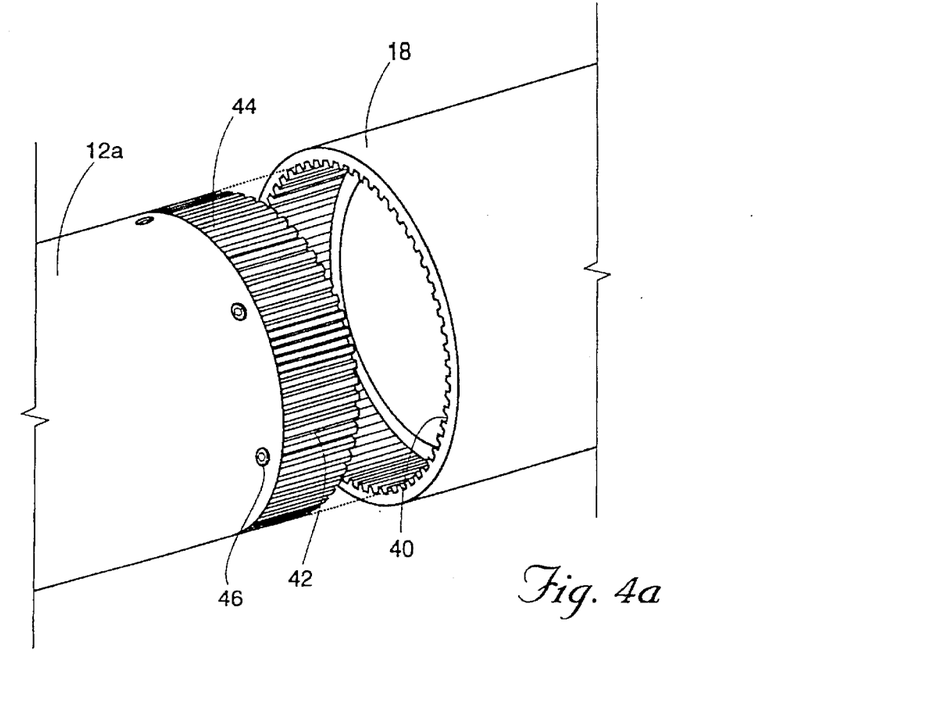
FIG. 4a is a fragmentary view of the splined drive connection of an end spreader roll segment, a splined connector, and a drive shaft member with parts broken away approximately along lines 4a—4a of FIG. 3.
Figure 5:
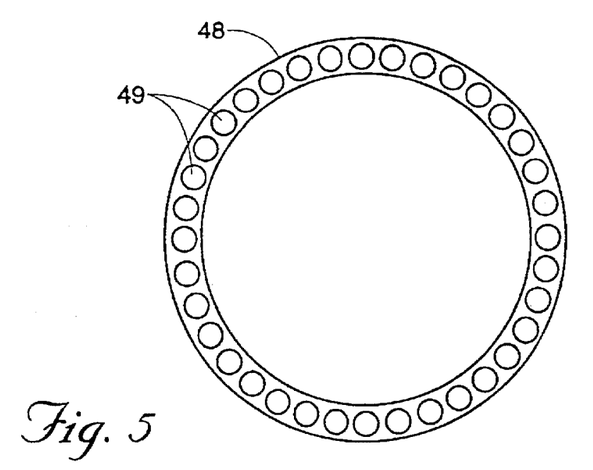
FIG. 5 is an end view of the spring spacer and showing circumferentially spaced spring members.

The present invention further contemplates an axially slidable splined connection between the end segment 12a and the cup-like drive shaft 18, as may be seen particularly in the views of FIGS. 3, 4, and 5. The splined connection between the end roller segment 12a includes a counterbore 38 in the drive shaft 18 which is defined by a series of circumferentially spaced grooves 40 arranged to receive complementary elongated splined grooves 42 machined into the outer surface of an annular coupling member 44. The splined coupling member 36 is held in place by means of screws 46 which connect the spreader roll 12a with the member 44.

Figure 5A:
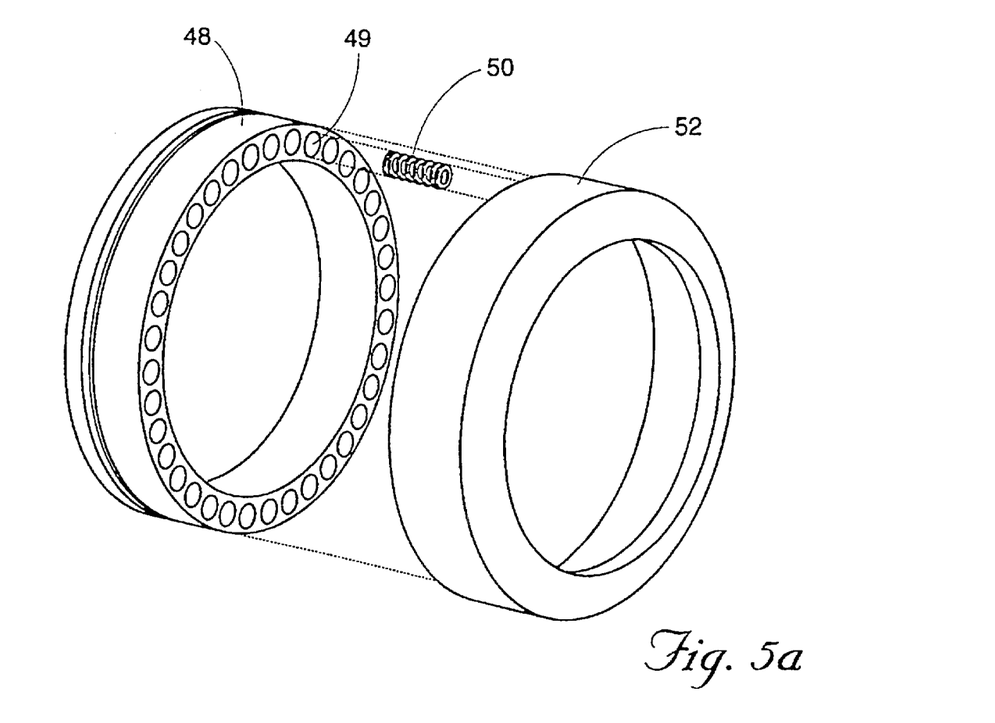
FIG. 5a is a fragmentary view of a spring spacer and retaining cup components of a splined connection with parts broken away taken approximately along lines 5a—5a of FIG. 3.

The splined coupling member 44 is further retained in place by means of a spring spacer 48, seen particularly in FIGS. 5 and 5a. The spring spacer 48 includes a plurality of circumferentially spaced reentrant bores 49 each containing a respective compression spring 50. As seen in FIG. 5a, the spring spacer 48 is retained in cup member 52.

It will be apparent that the connection between the segment 12a and the drive shaft 18 is secured by the axially slidable splined connection of complementary grooves 40 and 42, and is further arranged to be flexibly mounted with respect to the non-rotative shaft 13 by means of the multiplicity of springs 50 retained by the reentrant bores 49 in spring spacer 48. Further flexible connection between the non-rotative shaft 13 and the supporting pedestal or bracket 16 is illustrated in connection with the views of FIG. 3, wherein the bracket 16 includes a spherical axial ball clamp member 54 having an outer surface 56 conforming to the inner surface 57 of the bracket 16. The ball clamp 54 includes ball bearings 58 rotatably supported upon the drive shaft extension 59. A bracket plug 60, preferably located at the top of the bracket 16 is provided to provide resistance against the spherical member 54, and to permit, when loosened, the spherical member 54 to be adjustably rotated with respect to the spherical inner surface 57 of the bracket 16 and accommodate the position of the non-rotative shaft 13 and connecting drive shaft 18. Thus, adjustments may be made of the drive shaft 18 and the non-rotative shaft 13 to permit flexibility of all of the supported and rotating parts of the present spreader roll arrangement. As shown in the views of FIGS. 2 and 3, a conventional flexible coupling 22 is provided for connection between extension 25 and drive motor 20.

Figure 6:
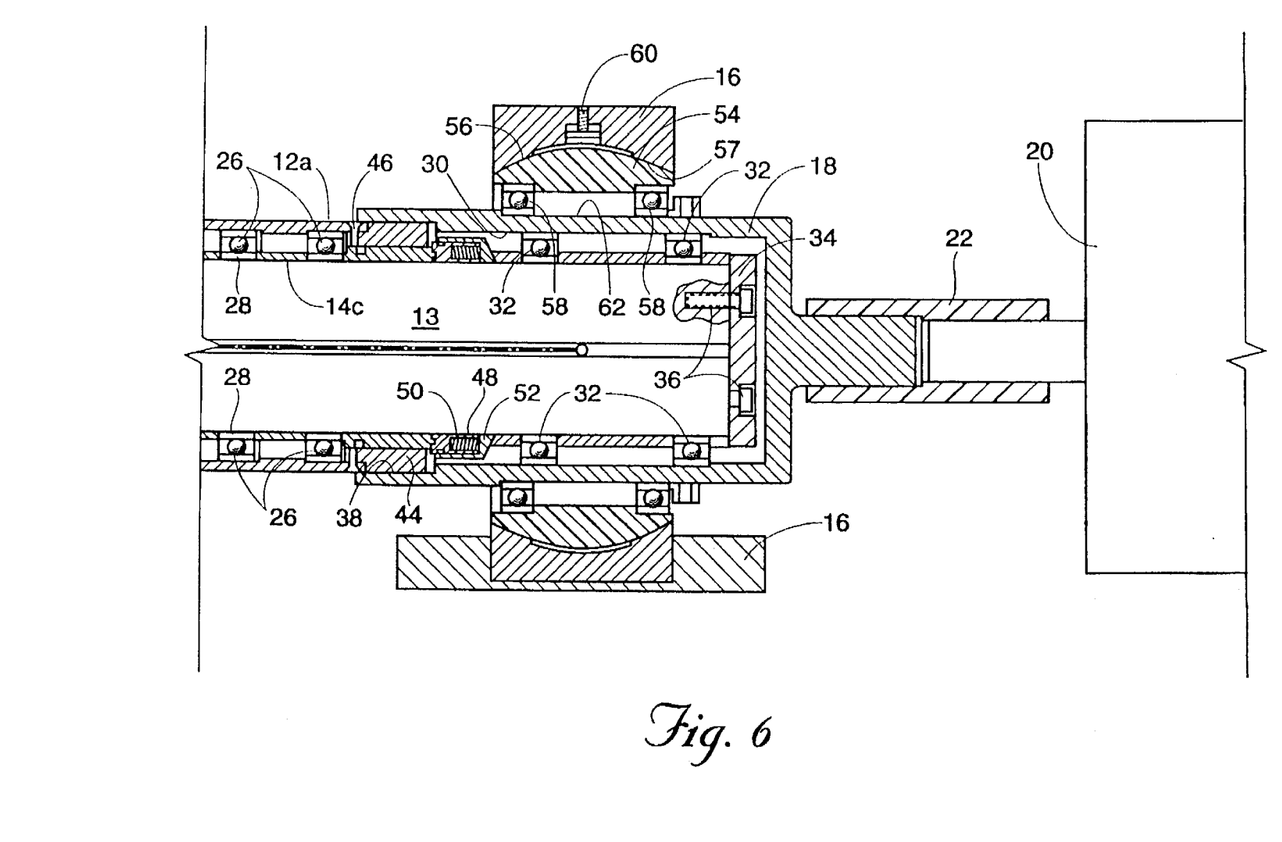
FIG. 6 is a fragmentary, longitudinal sectional view of another embodiment of the drive shaft assembly of this invention.

Another embodiment of the spreader roll 10 connection arrangement according to the present invention is seen with particular attention to the view of FIG. 6.

The arrangement of FIG. 6 comprises a bowed or bowable, non-rotating shaft 13 carried on supporting pedestals or brackets 16 and a cylindrical outer surface 24 comprising a plurality of cylindrical elements 12 which are mutually inter-connected. As may be seen in FIG. 6, the end cylinder element 12a includes a bore 14 rotatably supported on the fixed shaft 13. In this embodiment, the outer surface 62 of the cup-like drive shaft 18 is rotatably supported by the clamp member 54 via ball bearings 58. This is in contrast to the supporting arrangement shown in the embodiment of FIG. 3, wherein a shaft extension 59 is supported by the clamp member 54. Each embodiment includes a conventional flexible coupling 22 to connect extension 25 with drive motor 20.

It will be apparent that the present invention, in its various embodiments, provides a simplified adjustable support for a spreader roller 10 and a supporting fixed shaft 13. The adjustable support preferably comprises a stationary pedestal 16 having an inner spherical surface 57 and mating adjustable connection with a mating spherical surface of a drive shaft, a flexible connector 22 joining the drive shaft 18 with a drive motor 20 and a flexible splined connection between the drive shaft 18 and a spreader roller end segment 12a.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A flexible end supporting arrangement for direct drive of a spreader roll drive, the arrangement comprising:
   a drive means;
   a fixed, arched shaft on which a plurality of flexibly coupled cylindrical roll segments are rotatably supported;
   said cylindrical roll segments including at least one end roll segment;
   a cylindrical drive shaft coupled to at least one end roll segment;
   a stationary member including a spherical internal supporting surface and at least one aperture having a threaded portion;
   a clamping member having a spherical outer surface arranged for mating engagement with said spherical internal supporting surface of said stationary member, and a threaded bracket plug located in said aperture and having a surface engagable with said spherical outer surface of said clamping member to provide rotational resistance of said clamping member with respect to said stationary member; and a flexible coupling member connecting said drive shaft to said drive means.

2. The arrangement of claim 1, wherein said drive shaft includes a bore portion arranged for surrounding and rotatably supporting said at least one end roll segment.

3. The arrangement of claim 2, wherein said bore portion includes a counterbore portion having an internal surface including a plurality of circumferentially spaced grooves arranged for axially slidable mating engagement with a splined connector.

4. The arrangement of claim 3 wherein said splined connector includes a plurality of circumferentially spaced longitudinal grooves arranged for mating engagement with said grooves formed in said counterbore portion in said bore.

5. The arrangement of claim 2 wherein said bore portion includes an annular spring spacer surrounding said arched shaft, said spring spacer includes a plurality of circumferentially spaced reentrant bores and a plurality of compression springs seated in respective ones of said reentrant bores and being biased towards and abutting said splined connector.

* * * * *